(12) United States Patent
Pace et al.

(10) Patent No.: US 8,319,938 B2
(45) Date of Patent: Nov. 27, 2012

(54) STEREO CAMERA WITH EMULATED PRIME LENS SET

(75) Inventors: Vincent Pace, Shadow Hills, CA (US); Patrick Campbell, Stevenson Ranch, CA (US)

(73) Assignees: James Cameron, Burbank, CA (US); Vincent Pace, Burbank, CA (US)

( * ) Notice: Subject to any disclaimer, the term of this patent is extended or adjusted under 35 U.S.C. 154(b) by 553 days.

(21) Appl. No.: 12/578,406

(22) Filed: Oct. 13, 2009

(65) Prior Publication Data

US 2011/0085142 A1 Apr. 14, 2011

(51) Int. Cl.
*G03B 19/22* (2006.01)
*G03B 35/08* (2006.01)

(52) U.S. Cl. .............. 352/57; 352/60; 348/47; 396/325

(58) Field of Classification Search ............... 348/47; 352/44, 57, 58, 60; 396/324, 325, 329, 333
See application file for complete search history.

(56) References Cited

U.S. PATENT DOCUMENTS

| 4,881,122 | A | * | 11/1989 | Murakami | 348/47 |
| 4,999,713 | A | | 3/1991 | Ueno et al. | |
| 5,699,108 | A | * | 12/1997 | Katayama et al. | 348/47 |
| 5,801,760 | A | * | 9/1998 | Uomori | 348/47 |
| 6,701,081 | B1 | * | 3/2004 | Dwyer et al. | 396/329 |
| 2011/0050856 | A1 | * | 3/2011 | Nakazawa et al. | 348/47 |
| 2011/0234767 | A1 | * | 9/2011 | Tokiwa | 348/47 |

OTHER PUBLICATIONS

Canon, "HD Electronic Cinematography Lenses", Brochure, pp. 1-6.
Carl Zeiss, DigiPrime Family Brochure, pp. 1-8.

* cited by examiner

*Primary Examiner* — William C Dowling
(74) *Attorney, Agent, or Firm* — SoCal IP Law Group LLP; John E. Gunther; Steven C. Sereboff (57) ABSTRACT

There is disclosed a stereographic camera system including a first camera and a second camera including respective first and second lenses. A zoom mechanism may synchronously set focal lengths of the first and second lenses to a selected focal length of a plurality of predetermined focal lengths.

21 Claims, 5 Drawing Sheets

STEREO CAMERA WITH EMULATED PRIME LENS SET

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on distant object, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of the second polarization state. Stereoscopic displays of this type typically project the two polarized images onto a common projection screen. This technique has been used to present 3-D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Cinematic filming or recording is often done using fixed focal length lenses, commonly called prime lenses. For example, Carl Zeiss offers prime lenses in focal lengths of 3.9, 5, 7, 10, 14, 20, 28, 40, and 70 millimeters for use with ⅔-inch video cameras. With the exception of the longest and shortest focal length lenses, all of these lenses are physically the same size, and all of these lenses are compatible with the same matte box, filters, and motorized or manual control systems used to control focus and lens aperture. Thus a cinematographer or camera operator can change the field of view of a camera by exchanging one prime lenses for another. Similarly, Cooke Optics Limited offers prime lenses in 18 different focal lengths from 12 mm to 300 mm for use with 35 mm film cameras. Other manufacturers also offer prime lens sets for video or film cinematography.

Stereographic camera systems typically include two cameras having respective lenses. Stereography relies on differences between the images captured by the two cameras to create an impression of depth. However other factors, such as differences in the focal length, centration, or other characteristic of the lenses of the two cameras, may cause differences in the images captured by the two cameras that distort or obscure the desired impression of depth. Thus a stereographic camera system using prime lenses requires matched pairs of lenses for each focal length.

Throughout this description, elements appearing in schematic views and block diagrams are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
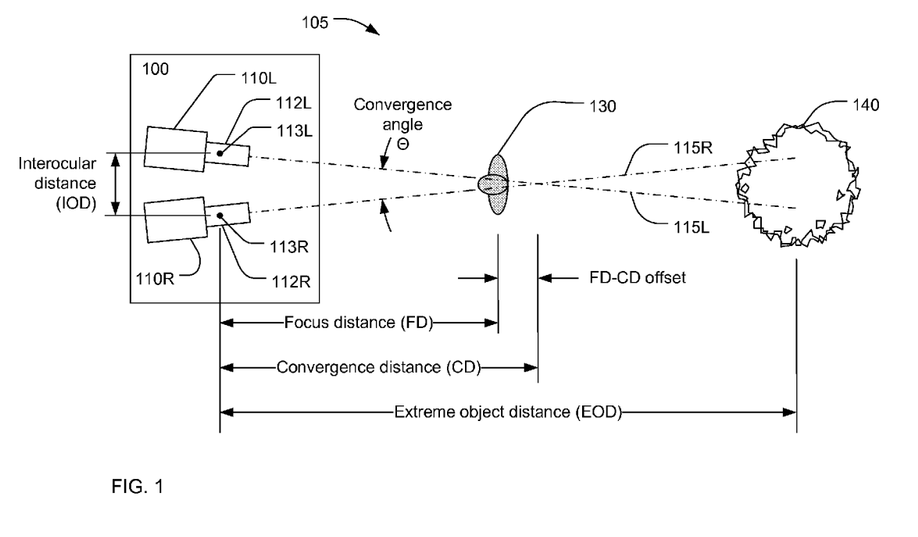
FIG. 1 is a schematic view of a stereographic camera in an environment.

Referring now to FIG. 1, a stereographic camera 100 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. Each of the left and right cameras 110L, 110R may include a lens 112L, 112R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 110L, 110R.

The left and right cameras 110L, 110R may be separated by an interocular distance IOD. The cameras 110L, 110R may be disposed such that the axis 115L, 115R are parallel or such that a convergence angle Θ is formed between the two axis 115L, 115R. The cameras 110L, 110R may be disposed such that the axis 115L, 115R cross at a convergence distance CD from the cameras. The interocular distance IOD, the convergence distance CD, and the convergence angle Θ are related by the formula $$\Theta = 2A\ \text{TAN}(IOD/2CD), \text{ or} \quad (1)$$

$$CD = IOD/[2\ \text{TAN}(\Theta/2)] \quad (2)$$

The interocular distance IOD and the convergence distance CD may be measured from a nodal point within the lenses 112L, 112R, which may be the center of an entrance pupil of each lens 112L, 112R. The convergence angle Θ may be set by rotating each of the cameras 110L, 110R about a corresponding pivot axis 113L, 113R.

The stereographic camera 100 may be used to form a stereographic image of a scene 105. As shown in the simplified example of FIG. 1, the scene 105 may include a primary subject 130, which is shown, for example, as a person. The scene 105 may also include other features and objects in the background (behind the primary subject 130) or the foreground (between the camera and the primary subject 130). When the images from a stereographic camera, such as the stereographic camera 100, are displayed on a viewing screen, scene objects at the convergence distance will appear to be in the plane of the viewing screen. Scene objects, such as the primary subject 130 in the example of FIG. 1, located closer to the stereographic camera may appear to be in front of the viewing screen. Scene objects, such as the tree 140, located further from the stereographic camera may appear to be behind the viewing screen.

Each lens 112L, 112R may have adjustable focus. The lenses 112L, 112R may be focused at a common adjustable focus distance FD. The focus distance FD may be adjusted manually, or may be automatically adjusted. The focus distance FD may be adjusted such that the cameras 110L, 110R are focused on the primary subject 130. The focus distance may be automatically adjusted in response to a sensor (not shown) that determines the distance from the cameras 110L, 110R to the primary subject 130. The sensor to determine the distance from the cameras to the primary subject may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 130. However, as shown in FIG. 1, the convergence distance CD and the focus distance FD may not be the same distance. For example, the focus distance FD may be set at the distance from the cameras to the primary subject and the convergence distance CD may be set slightly longer than the focus distance. In this case, when the images are displayed, the primary subject will be seen to be in front of the plane of the viewing screen.

Each lens 112L, 112R may also have zoom capability, which is to say that the focal length FL of each lens may be adjusted. The focal lengths of the lenses 112L, 112R may be adjusted manually or automatically. The focal lengths of the lenses 112L, 112R may be adjusted synchronously such that focal lengths of the lenses are precisely the same at all times. The focal lengths of the lenses 112L, 112R may be adjustable over a predetermined continuous range of focal lengths.

Although the focal lengths of the lenses 112L, 112R may be adjustable over a continuous range, the focal lengths of the lenses 112L, 112R may be restricted to a plurality of predetermined focal lengths. The lenses 112L, 112R may be characterized and controlled to provide essentially identical performance at a plurality of predetermined focal lengths. In this context, the term "essentially identical" means that the characteristics of the lenses 112L, 112R are identical to the extent that the residual differences between the lenses 112L, 112R do not cause any visible distortion or degradation of the apparent depth resulting from the intentional disparity between the images captured by the left and right cameras 110L, 110R.

The plurality of predetermined focal lengths may, for example, include the focal lengths of all or portions of a family of prime lenses. Thus the lenses 112L, 112R may be operable to emulate a plurality of matched pairs of prime lenses. The term "emulate" is used with its normal meaning of "imitate with the intention of equaling or outdoing". The lens 112L, 112R may be characterized and controlled to provide equal or better imaging than a plurality of matched pairs of prime lenses. The plurality of predetermined focal lengths may include one or more focal lengths simulated during creation of computer-generated images. Constraining the focal lengths of the lenses 112L, 112R to one or more focal lengths simulated during creation of computer-generated images may facilitate integrating the computer-generated images with live-action images recorded with the stereographic camera system 100.

Figure 2:
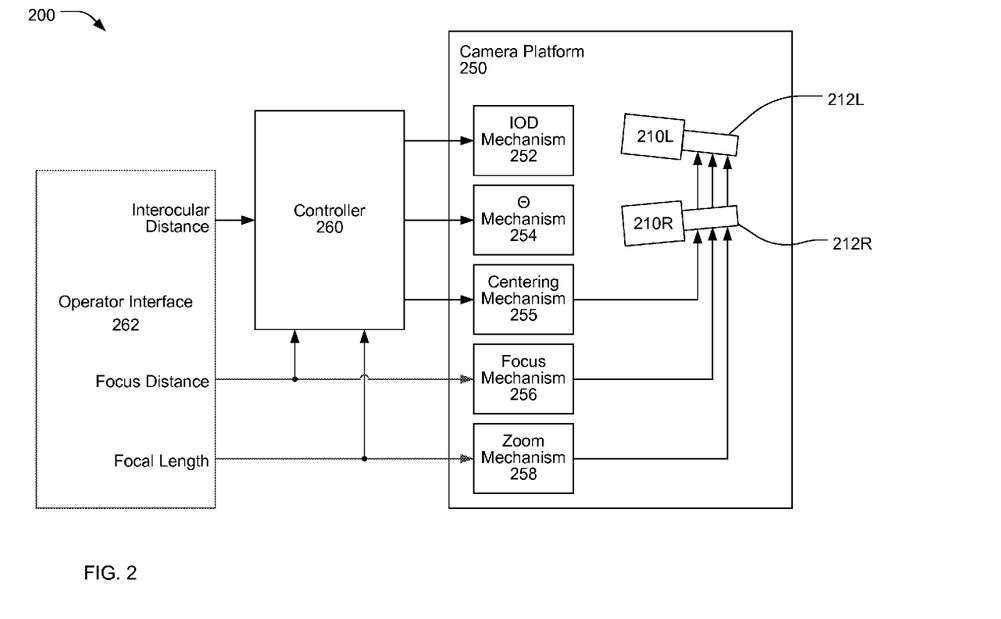
FIG. 2 is a block diagram of a stereographic camera system.

Referring now to FIG. 2, a stereographic camera system 200 may include a camera platform 250 coupled to a controller 260. The camera platform 250 may include a left camera 210L and a right camera 210R, each of which has an associated lens 212L, 212R.

The camera platform 250 may include a plurality of mechanisms to adjust the position and/or orientation of the left and right cameras 210L, 210R and to adjust characteristics of the lens and right lenses 212L, 212R. In this patent, the term "mechanism" refers to a combination of mechanical, electrical, and electromechanical components, including at least one component movable with respect to other components, and an actuator which causes relative motion of the movable component. The relative motion may be linear, angular, a combination or linear and angular, or some other movement. The movable components may be coupled by rotary or linear slides, bearings, bushings, or other devices. The actuator may be a motor, a solenoid, or a manually operated lever, knob, crank, ring, or other device. The actuator may be all or a portion of one of the movable components, or may be coupled to the movable components by way of one or more gears, belts, links, and other devices. Examples of mechanisms include motorized linear or rotational motion stages and manual or motorized systems currently used to adjust focus and aperture on cinematic camera lenses.

The camera platform 250 may include an IOD mechanism 252 to adjust an interocular distance between the left camera 210L and the right camera 210R. The camera platform 250 may include a Θ mechanism 254 to adjust a convergence angle between the left camera 210L and the right camera 210R by pivoting one or both cameras about a respective pivot axes. The IOD mechanism 252, and the Θ mechanism 254 may include one or more movable platforms or stages coupled to motors or other actuators. The IOD mechanism 252 and the Θ mechanism 254 may be adapted to set the interocular distance and the convergence angle, respectively, in response to data received from the controller 260. Within this patent, the term "data" is intended to include digital data, commands, instructions, digital signals, analog signals, optical signals and any other data that may be used to communicate the value of a parameter such as interocular distance or convergence angle.

The camera platform 250 may include a focus mechanism 256 to synchronously adjust and set the focus distance of the lenses 212L, 212R. The focus mechanism 256 may include a mechanical, electronic, electrical, or electro-mechanical linkage between the lenses 212L, 212R to simultaneously adjust the focus distance of both lenses to the same value. The focus mechanism 256 may include a motor or other actuator adapted to set the focus distance in response to data received from the controller 260. The focus mechanism 256 may include separate motors or other actuators to set the focus distance of each of the lenses 212L, 212R. The focus mechanism 256 may be manually controlled by an operator such as a cameraman or assistant cameraman (commonly called a "focus puller"). When manually controlled, the focus mechanism 256 may include an encoder, potentiometer, or other sensor to provide data indicating the focus distance to the controller 260. The focus mechanism 256 may be adapted to operate under manual control and/or in response to data received from the controller 260.

The camera platform 250 may include a zoom mechanism 258 to synchronously adjust and set the focal length of the lenses 212L, 212R. The zoom mechanism 258 may include a mechanical, electronic, electrical, or electro-mechanical linkage between the lenses 212L, 212R to simultaneously adjust the focal length of both lenses to the same value. The zoom mechanism 258 may include a motor or other actuator adapted to set the focal length in response to data received from the controller 260. The zoom mechanism 258 may include separate motors or other actuators adapted to set the focal lengths of the left lens 212L and the right lens 212R in response to data received from the controller 260. The zoom mechanism 258 may be manually controlled by an operator such as a cameraman or assistant cameraman. When manually controlled, the zoom mechanism 258 may include an encoder, potentiometer, or other sensor to provide data indicating the focal length to the controller 260. The zoom mechanism 258 may be adapted to operate either under manual control or in response to data received from the controller 260.

The operation of the zoom mechanism 258 may be constrained to set the focal length of the lenses 212L, 212R any of a plurality of predetermined focal lengths. The focal length of the lenses 212L, 212R may be fixed at one of the predetermined focal lengths during the recording of any single scene. The plurality of predetermined focal lengths may, for example, include the focal lengths of all or a portion of a set of prime lenses. The plurality of predetermined focal lengths may include one or more focal lengths simulated during creation of computer-generated images that may be combined with live images recorded with the stereographic camera system 200.

The camera platform 250 may include a centering mechanism 255 to adjust and set the centering of one or both of the lenses 212L, 212R. The centering mechanism may be effective to compensate for a variation in lens centering or variation in the location of the optical axis within the lens that may occur as a function of the focal length and/or focus distance setting of one or both of the lenses 212L, 212R. The centering mechanism may compensate for variations in lens centering by adjusting the position and/or inclination of one or both of the lenses 212L, 212R. For example, the controller 260 may store a table of lens centering values as a function of the focal length and/or focus distance settings for each of the lenses 212L, 212R. The controller may then cause the centering mechanism to adjust the location and/or inclination of one or both of the lenses 212L, 212R in response to the focal length and focus distance settings.

The controller 260 may be coupled to an operator interface 262. The controller 260 may receive data from the operator interface 262 indicating an interocular distance. The controller 260 may receive data from the operator interface 262 indicating a maximum allowable disparity and a maximum object distance indicating the distance from the camera to the furthest object is a scene. The controller 260 may then use the maximum allowable disparity to calculate an interocular distance as described in copending application Ser. No. 12/409,316, entitled Stereo Camera with Automatic Control of Interocular Distance. The controller 260 may also receive data from the operator interface 262 indicating the focus distance and focal length of the lenses 212L, 212R.

The operator interface 262 may be partially or wholly incorporated into the camera platform 250. For example, the focus mechanism 256 may be manually controlled by one or more operators such as a cameraman and/or an assistant cameraman. In this case, the focus mechanism may provide data to the controller 260 indicating the manually-set focus distance. Similarly, control actuators to set the interocular distance and/or maximum disparity may be located on the camera platform for operation by the cameraman and/or the assistant cameraman.

The operator interface 262 may be partially or wholly incorporated into the controller 260. For example, in situations where the interocular distance and/or the maximum allowable disparity are fixed during the recording of a scene, the interocular distance and/or the maximum allowable disparity may be manually provided to the controller using a keyboard or other data entry device. In situations where one or both of the interocular distance and/or the maximum allowable disparity will be varied during the recording of a scene, the interocular distance and/or the maximum allowable disparity may be controlled using, for example, arrows keys on a keyboard or one or more continuous control devices such as a potentiometer, joystick or mouse.

The controller 260 may interface with the camera platform 220. The controller 260 may be integrated into the camera platform 250. The controller may provide data to and/or receive data from the focus mechanism 256 and the zoom mechanism 258 indicating the focus distance and focal length, respectively, of the lenses 212L, 212R.

The controller 260 may provide data to the IOD mechanism 252 and the Θ mechanism 254 to set the interocular distance and the convergence angle, respectively, between the cameras 210L, 210R. For example, the controller 260 may provide data to the IOD mechanism 252 and/or the Θ mechanism 254 to set the convergence distance equal to the focus distance of the lenses 212L, 212R.

Figure 3:
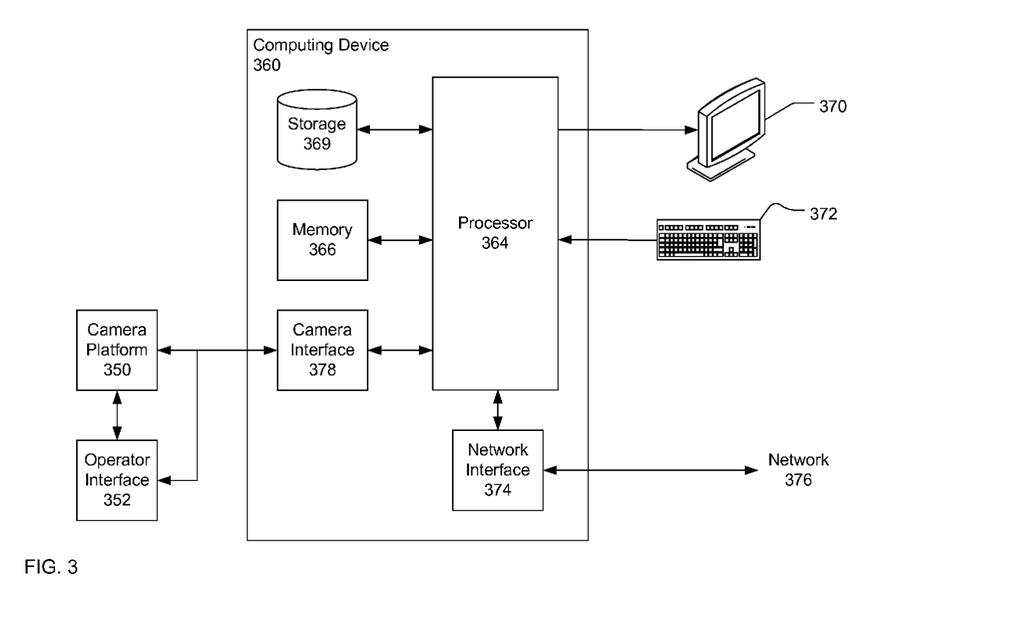
FIG. 3 is a block diagram of a computing device.

FIG. 3 is a block diagram of a computing device 360 that may be suitable for the controller 260. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 360 may include hardware, firmware, and/or software adapted to perform the processes subsequently described herein. The computing device may include a processor 364 coupled to memory 366 and a storage device 368.

The storage device 368 may store instructions which, when executed by the computing device 360, cause the computing device to provide the features and functionality of the controller 260. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 360 may include or interface with a display device 370 and one or more input devices such a keyboard 372. The computing device 360 may also include a network interface unit 374 to interface with one or more networks 376. The network interface unit may interface with the network 376 via a wired or wireless connection. The network 376 may be the Internet or any other private or public network.

The computing device 360 may also include a camera interface unit 378 to interface with a camera platform 350 and/or a camera operator interface 362. The camera interface unit 378 may include a combination of circuits, firmware, and software to interface with the camera platform 350 and/or the operator interface 362. The camera interface unit 378 may be coupled to the camera platform 350 and/or the operator interface 362 via a network which may be a local area network. The camera interface unit 378 may be coupled to the camera platform 350 and/or the operator interface 362 via one or more buses such as a USB bus, a PCI bus, a PCI Express bus, or other parallel or serial data bus. The camera interface unit 378 may be coupled to the camera platform 350 and/or the operator interface 362 via one or more direct wired or wireless connections. The camera interface unit 378 may be coupled to the camera platform 350 and/or the operator interface 362 via a combination of one or more of direct connections, network connections, and bus connections.

The processes, functionality and features of the computing device 360 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 360 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 364 and others by other devices.

Description of Processes

Figure 4:
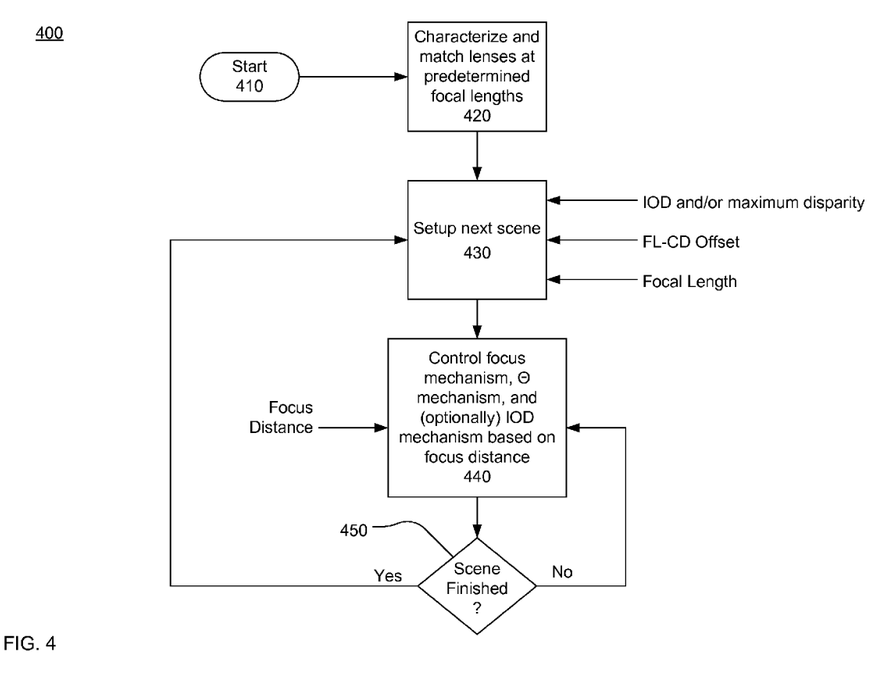
FIG. 4 is a flow chart of a process for recording stereographic images.

FIG. 4 is a flow chart of an exemplary process 400 for recording stereographic images using a stereographic camera system, such as the stereographic camera 200, wherein the focal lengths of zoom lenses are constrained to a plurality of predetermined focal lengths. Specifically, FIG. 4 is a flow chart of a process for recording a scene or plurality of scenes using the same cameras and lenses. The flow chart has a start 410 but does not end until the recording of all scenes is completed or the camera lenses are changed. The process 400 is continuous in nature and the actions within the process may be performed continuously and in near-real time during the recording of each scene.

Within this patent, the phrase "near-real time" means in real time except for processing delays that are very short compared with temporal events in the scene being recorded.

At 420, left and right lenses to be used during recording one or more scenes may be characterized at each of a plurality of predetermined focal lengths. The plurality of predetermined focal lengths may be selected to emulate at least a portion of a prime lens set. The plurality of predetermined focal lengths may include focal lengths selected for use in creating computer-generated images to be integrated with the images recorded by the process 400.

For example, each of the left and right lenses may include a rotatable zoom ring to set focal length and a rotatable focus ring to set focus distance. At 420 the exact angular position of the zoom ring to set the left lens to a first one of the plurality of focal lengths may be determined and data indicating the angular position may be stored. With the zoom ring set, data indicating the relationship between the angular position of the focus ring and the focus distance may be measured and stored. Further, data indicating the centering or the position of an optical axis within the left lens may be measured and stored as a function of the focus distance for the set focal length. The same data may be determined and stored for the right lens for the first predetermined focal length. The same data may be determined and stored for both lenses for each of the plurality of predetermined focal lengths.

At 430, the stereographic camera system may be prepared to record a scene. The preparation may include receiving data to set an interocular distance and a focus distance to convergence distance (FL-CD) offset. As described in copending application Ser. No. 12/409,316, the setup may include receiving data indicating a maximum allowable disparity and a maximum object distance. In this case, the interocular distance may be calculated and set in near real-time during the recording of the scene.

At 430, an operator selection of a selected focal length from the plurality of predetermined focal lengths may be received. The focal lengths of the left and right lenses may be set to the selected focal length based on data stored at 420.

At 440, the scene may be recorded. During recording the scene, data indicating a desired focus distance may be received. For example, the desired focus distance may be input in real time by a camera operator or focus puller. The focus distance of the left and right lenses may be set to the desired focus distance based on data stored at 420. Additionally, a convergence angle Θ of the left and right cameras may be set based on the desired focus distance. The convergence angle Θ may be set by rotating one or both cameras about respective pivot axes. The desired focus distance may be changed during the recording of the scene and the lens focus distances and the convergence angle may be set accordingly in near real-time throughout the recording of the scene.

The interocular distance between the left and right cameras may be fixed during recording of the scene. The interocular distance may be varied in near real-time during the recording of the scene based on the desired focus distance, the selected focal length, and data indicating a maximum allowable disparity received at 430. Copending application Ser. No. 12/409,316 describes a system for setting convergence angle and interocular distance in near-real time during recording.

At 450, a determination may be made if the recording of the scene has been completed. If the recording is ongoing, the process 400 may repeat continuously and in near real-time from 440. When the recording of a scene has been completed, the process 400 may return to 430 to record the next scene.

Figure 5:
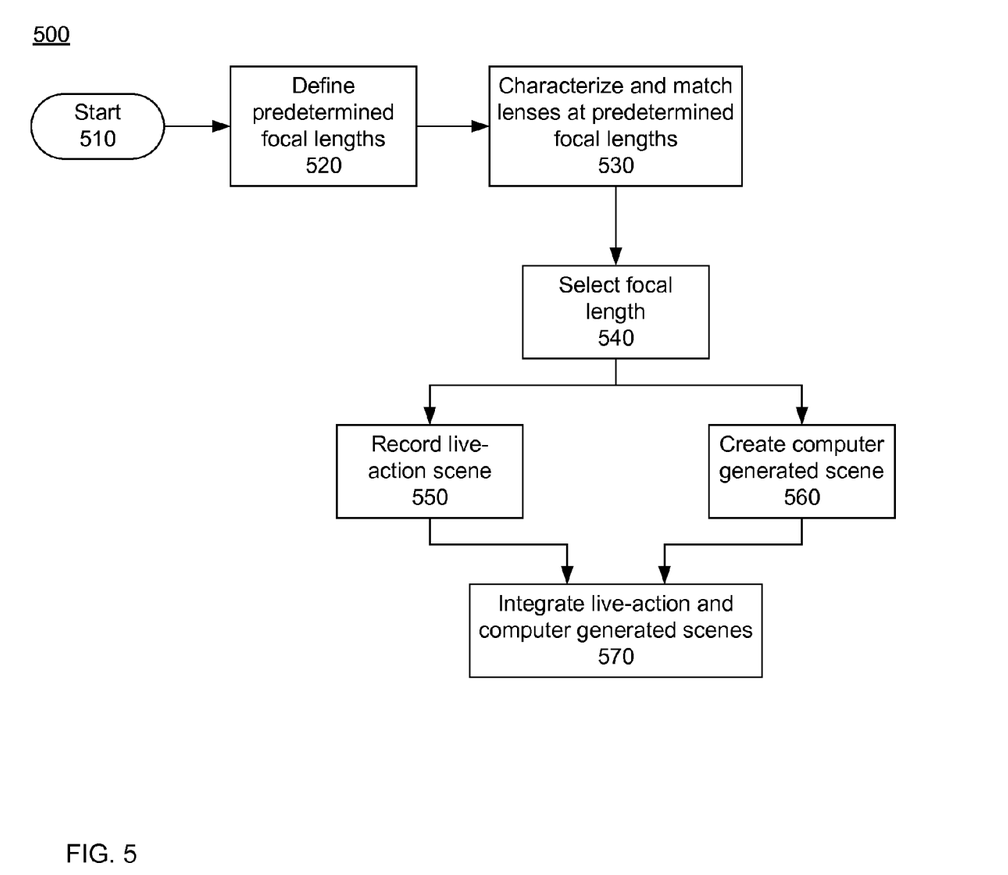
FIG. 5 is a flow chart of a process for creating a three dimensional motion picture.

FIG. 5 is a flow chart of an exemplary process 500 for creating a stereographic motion picture. Specifically, FIG. 5 is a flow chart of a process for creating a scene or plurality of scenes which integrate live-action images recorded using a stereographic camera and computer-generated images. The process 500 has a start 510 but does not end until the creation of all integrated live-action/computer-generated scenes is complete. Although the process 500 is directed to the creation of integrated live-action/computer-generated scenes, the completed motion picture may also include wholly live-action and wholly computer-generated scenes.

At 520, a finite plurality of lens focal lengths may be defined for use in both live action recording and during the creation of computer-generated images. At 530, the lenses of a stereographic camera may be characterized as previously described in conjunction with FIG. 4 at 420.

At 540 a single focal length of the plurality of focal lengths defined at 520 may be selected for use in a specific scene. At 550, live-action portions of the scene may be recorded using a stereographic camera having lenses set to the focal length selected at 540. The process for recording the live-action portions of the scene may be as described in conjunction with FIG. 4, 430-450.

At 560, computer generated portions of the scene may be created. The computer generated portions of the scene may be created by simulating the view of a virtual stereographic camera having virtual lenses set to the focal length selected at 540. At 570, live-action images recorded at 550 and computer-generated images created at 560 may be integrated into a scene. The live-action and computer generated images may be interleaved, superimposed, substituted, or otherwise combined. For example, the integration may include the substitution of a computer-generated background behind a live-action foreground or the converse, or the insertion of a computer-generated character into a live action scene or the converse.

During the creation of a motion picture, the actions at 520 and 530 may be performed only once, and the actions from 540-570 may performed for a plurality of scenes at least partially in parallel.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A stereographic camera system, comprising:
    a first camera and a second camera including respective first and second lenses;
    a memory storing characterization data for the first and second lenses for each of a plurality of predetermined focal lengths;
    a zoom mechanism to synchronously set focal lengths of the first and second lenses to a selected focal length of the plurality of predetermined focal lengths based on the stored characterization data for the selected focal length.

2. The stereographic camera system of claim 1, wherein the predetermined focal lengths are selected to emulate at least a portion of a prime lens set.

3. The stereographic camera system of claim 1, wherein the predetermined focal lengths are selected to match a plurality of focal lengths simulated during creation of computer-generated images.

4. The stereographic camera system of claim 1, further comprising:
    a controller adapted to receive an election of the selected focal length of the predetermined focal lengths from an operator interface, to retrieve the stored characterization data for the selected focal length from the memory, and to control the zoom mechanism to set the focal lengths of the first and second lenses to the selected focal length.

5. The stereographic camera system of claim 4, further comprising:
    a focus mechanism to synchronously set a focus distance of the first lens and the second lens based, at least in part, on the stored characterization data for the selected focal length.

6. The stereographic camera system of claim 5, further comprising:
    a centering mechanism;
    wherein the controller is further adapted to control the centering mechanism based on the stored characterization data for the selected focal length and the focus distance.

7. The stereographic camera system of claim 5, further comprising:
- a convergence mechanism;
- an interocular distance mechanism;
- wherein the controller is further adapted to control the convergence mechanism and the interocular distance mechanism based, at least in part, on the focus distance.

8. A method for operating a stereographic camera including first and second cameras having respective first and second lenses, the method comprising:
- prior to recording a first scene,
- storing, in a memory, characterization data for the first and second lenses for each of a plurality of predetermined focal lengths;
- prior to recording a-the first scene and each subsequent scene,
- of selecting one of the plurality of predetermined focal lengths;
- controlling a zoom mechanism of the stereographic camera to set focal lengths of the first lens and the second lens to the selected focal length based on the stored characterization data for the selected focal length.

9. The method for operating a stereographic camera of claim 8, further comprising:
- prior to recording the first scene and each subsequent scene, controlling a centering mechanism of the stereographic camera based on, at least in part, the stored characterization data for the selected focal length.

10. The method for operating a stereographic camera of claim 8, further comprising, while recording the first scene and each subsequent scene:
- setting a focus distance of the first lens and the second lens
- controlling a convergence mechanism and an interocular distance mechanism of the stereographic camera based on, at least in part, the focus distance.

11. The method for operating a stereographic camera of claim 10, wherein setting a focus distance comprises:
- receiving an operator election of a desired focus distance;
- controlling a focus mechanism of the stereographic camera to set focus distances of the first camera and the second camera to the desired focus distance mechanism based on, at least in part, the stored characterization data for the selected focal length.

12. The method for operating a stereographic camera of claim 8, wherein
- the predetermined focal lengths are selected to emulate at least a portion of a prime lens set.

13. The method for operating a stereographic camera of claim 8, wherein
- the predetermined focal lengths are selected to match a plurality of focal lengths emulated during creation of computer-generated images.

14. A computing device to control a stereographic camera, the computing device comprising:
- a processor;
- a camera interface unit coupled to the processor;
- a memory coupled with the processor;
- a storage medium having instructions stored thereon which when executed cause the computing device to perform actions comprising:
  - prior to recording a first scene, storing characterization data characterizing the first lens and the second lens at each of a plurality of predetermined focal lengths;
  - prior to recording the first scene and each subsequent scene, receiving data, via the camera interface unit, indicating an operator selection of one of a-the plurality of predetermined focal lengths and controlling, via the camera interface unit, a zoom mechanism of the stereographic camera to set focal lengths of the first lens and the second lens to a selected one of the plurality of predetermined focal lengths based on the stored characterization data for the selected focal length.

15. The computing device of claim 14, the actions performed further comprising:
- prior to recording the first scene and each subsequent scene, controlling a centering mechanism of the stereographic camera based on, at least in part, the stored characterization data for the selected focal length.

16. The computing device of claim 14, the actions performed, while recording the first scene and each subsequent scene, further comprising:
- receiving, via the camera interface unit, data indicating a desired focus distance;
- controlling, via the camera interface unit, a convergence mechanism and an interocular distance mechanism of the stereographic camera based on, at least in part, the desired focus distance.

17. The computing device of claim 16, the actions performed, while recording the first scene and each subsequent scene, further comprising:
- controlling, via the camera interface unit, a focus mechanism of the stereographic camera to set focus distances of the first camera and the second camera to the desired focus distance;
- wherein controlling the focus mechanism based on, at least in part, the stored characterization data for the selected focal length.

18. The computing device of claim 14, wherein
- the predetermined focal lengths are selected to emulate at least a portion of a prime lens set.

19. The computing device of claim 14, wherein
- the predetermined focal lengths are selected to match a plurality of focal lengths simulated during creation of computer-generated images.

20. A method for creating a three-dimensional motion picture using a stereographic camera including first and second cameras having respective first and second lenses, comprising:
- storing, in a memory, characterization data for the first and second lenses for a plurality of predetermined focal lengths;
- prior to recording a live-action scene;
- selecting one of the plurality of predetermined focal lengths;
- controlling a zoom mechanism of the stereographic camera to set focal lengths of the first lens and the second lens to the selected focal length based on the stored characterization data for the selected focal length;
- recording the live-action scene;
- creating a computer-generated scene which simulates a scene captured by a virtual stereographic camera having lenses set to the selected focal length integrating the recorded live-action scene and the computer-generated scene.

21. The method of creating a three-dimensional motion picture of claim 20, wherein:
- a plurality of recorded live-action scenes are integrated with a corresponding plurality of computer-generated scenes, wherein
- each live action scene is recorded with the focal lengths of the first lens and the second lens set to one of the plurality of predetermined focal lengths based on the stored characterization data and is integrated with a computer-generated scene generated by simulating a virtual camera with lenses having the same focal length.

* * * * *